United States Patent
Chiang et al.

(10) Patent No.: US 6,602,924 B1
(45) Date of Patent: Aug. 5, 2003

(54) FOAMED GYPSUM COMPOSITIONS

(76) Inventors: Jin-Chih Chiang, 105 Fairview Dr., Lansdale, PA (US) 19446; Yen-Yau H. Chao, 1964 Bishopwood Blvd., Harleysville, PA (US) 19454

(*) Notice: Subject to any disclaimer, the term of this patent is extended or adjusted under 35 U.S.C. 154(b) by 0 days.

(21) Appl. No.: 10/131,270

(22) Filed: Apr. 23, 2002

(51) Int. Cl.⁷ ................. C08J 9/00; C08J 9/02
(52) U.S. Cl. ............. 521/83; 521/90; 521/94; 521/100; 521/128; 521/135; 521/178
(58) Field of Search ............. 521/83, 90, 94, 521/135, 178, 100, 128

(56) References Cited

U.S. PATENT DOCUMENTS

| | | |
|---|---|---|
| 4,403,006 A | 9/1983 | Bruce et al. |
| 4,966,927 A | 10/1990 | Hodson |
| 5,162,060 A | 11/1992 | Bredow et al. |
| 5,475,039 A | 12/1995 | Bütikofer |
| 5,696,174 A | 12/1997 | Chao et al. |
| 6,274,650 B1 | 8/2001 | Cui |

FOREIGN PATENT DOCUMENTS

| | | |
|---|---|---|
| JP | 63310757 A | 12/1988 |
| JP | 2006378 A | 1/1990 |
| JP | 3069538 A | 3/1991 |
| JP | 4292445 A | 10/1992 |
| JP | 7257952 A | 10/1995 |
| JP | 8208295 A | 8/1996 |
| JP | 11028717 A | 2/1999 |
| JP | 11139858 A | 5/1999 |

*Primary Examiner*—Morton Foelak
(74) *Attorney, Agent, or Firm*—RatnerPrestia

(57) ABSTRACT

A foamed gypsum composition is provided. The composition may be used in making a crosslinked, foamed gypsum product. The composition is comprised of gypsum, foaming agents, epoxy resin, and a hardener. Optional ingredients would include one or more additives selected from the group consisting of inert fillers, aggregates, clay, sand, fibers, pigments, dyes, polymeric cement binder, plasticizers, superplasticizers, mineral wool, scrim, and freeze-prevent additives. Objects made from the composition include boards, interior walls, ceiling tiles, acoustical tiles, acoustical panels, roof decking, and flooring.

9 Claims, No Drawings

FOAMED GYPSUM COMPOSITIONS

FIELD OF THE INVENTION

The present invention relates generally to gypsum compositions, and more specifically to lightweight, foamed gypsum compositions and products made therefrom.

BACKGROUND OF THE INVENTION

Gypsum boards have been commonly employed in construction, such as interior walls, ceilings, and acoustical tiles and panels. It is well known that gypsum boards, particularly in ceiling applications, tend to sag or fail under high humidity conditions. When in contact with water, the water absorbed by the gypsum dry walls may dissolve the gypsum and reduce the mechanical strength of the material. This can be particularly problematic where the washability of the panels is desired.

Dispersions of epoxy reins with hardening agents have been used to improve the strength of coating materials. U.S. Pat. No. 5,475,039 discloses hardening agents for aqueous epoxy resins. U.S. Pat. No. 6,274,650 discloses the making of liquid epoxy encapsulants comprising a basic bisphenol-type epoxy resin with epoxy groups and an amine hardening agent. U.S. Pat. No. 4,966,927 discloses an in-situ reaction to generate a hardening agent from the mixing of methylene chloride and monoethanol amine. The new hardening agent can be mixed with epoxy and have a long pot life. The new binder can be used to improve overlay coatings for concrete or asphalt surface.

Incorporations of epoxy resins/hardeners in concrete and cement are known in the prior art. For example, JP 11,139,858A discloses a mixture of epoxy resins, polyamine and wet concrete or mortar to protect concrete from an acid rain to prolong a service life. U.S. Pat. No. 5,162,060 discloses the use of hydraulic cement, ureido-functional latex, epoxy hardening agent, and epoxy to improve cement chemical resistance. JP 63,310,757A discloses the making of a workable concrete having high strength and low shrinkage by using epoxy resin and a hardening agent (a mixture of polycondensate of xylenediamine, phenol and formalin, and polyamide). JP11,028,717A discloses a preparation by blending epoxy resin either in cement, sand, or other aggregates with a hardening agent in an aqueous mixture. JP 08,208,295A discloses the use of epoxy (glycerol diglycidyl ether) and water-reducing agent for concrete with an epoxy resin hardener (ethylenediamine) to provide fluidity and to give good mechanical strength. JP 07,257,952A discloses the formulation of hydraulic cement with bisphenol A and epichlorhydrine type epoxy resins to obtain a high strength polymer concrete. JP 03,069,538A discloses the acceleration of hardening of cement and the prevention of shrinkage and cracking due to drying by blending cement with epoxy resin, Portland cement, calcium aluminate, gypsum, epoxy resin hardening agent, and set regulating agent, and water. It was stated that the formation of calcium hydroxide or 'slaked lime' in the cement hydration process and the resulting alkaline by-products hydrolyzed the epoxy resins and adversely reduced the epoxy efficiency.

Incorporation of epoxy resins in the production of lightweight concrete is also known in the prior art. For example, JP 02,006,378A discloses the production of lightweight cellular concrete by mixing cement, aggregate, water, and an epoxy resin (bisphenol A/epichlorohydrin type epoxy resin emulsion) to shorten demolding time. A 3–10% by weight of epoxy resin based on 100 parts of cement was also disclosed in the patent. A foam agent was introduced into the cement slurry to make a lightweight cellular concrete.

JP 4,292,445A discloses the blending of cement with a lightweight fine aggregate, epoxy resins, and polyester resin to provide a cement composition having sufficient strength.

U.S. Pat. No. 5,696,174, owned by Allied Foam Tech, discloses foamed gypsum for making boards, panels, roof decking, and flooring.

U.S. Pat. No. 4,403,006 discloses the incorporation of coal fly ash in a gypsum slurry used in forming lightweight gypsum boards and a method of producing those boards.

It is an object of the present invention to provide a composition of high performance foamed gypsum boards. Another objective is to provide a non-cementitious hydraulic mix where epoxy will have prolonged life without the alkalinity from hydrolyzed cement. It is another objective to provide lightweight foamed gypsum boards with foam stability not adversely affected by the addition of epoxy and amines. The improved lightweight foam gypsum boards can be used in the building construction for interior walls, ceilings, and acoustical tiles and panels that give high compressive strength, high bending strength, good surface abrasive resistance, washability, and excellent sagging resistance.

SUMMARY OF THE INVENTION

The present invention is a lightweight, foamed gypsum composition that has high compressive strength and also high bending strength. The improved lightweight foam gypsum boards made in accordance with the present invention provide good surface abrasion resistance, wash resistance, and sagging resistance. The improved lightweight foam gypsum boards can be used in building construction for interior walls, ceilings, and acoustical tiles and panels, among other uses. The foamed gypsum composition of the present invention comprises gypsum, a foaming agent, epoxy resin, and a hardener.

DETAILED DESCRIPTION OF THE INVENTION

Epoxies and hardeners tend to induce significant foam collapse when conventional surfactants or protein-based foam agents are used. No prior art is known to produce lightweight gypsum foam materials with a combination of epoxy resins and hardener agents. In accordance with the present invention, foaming agents, such as those disclosed in U.S. Pat. No. 5,696,174, are used to make stable preformed foams for lightweight and foamed gypsum materials. The addition of epoxy resins and hardeners do not adversely affect the foam stability of the improved lightweight and foamed gypsum compositions in the present invention. The improved lightweight gypsum boards with the addition of epoxy resins and hardeners demonstrate high compressive strength, high bending strength, good surface abrasion resistance, washability, and excellent sagging resistance. This makes the improved lightweight and foamed gypsum boards particularly useful as interior walls, ceilings, and acoustical tiles and panels.

More specifically, the present invention uses epoxy resins and hardeners in conjunction with the improved lightweight and foamed gypsum materials, and the foam stability of the lightweight and foamed gypsum compositions is not adversely affected by the addition of epoxy resins and hardeners. In accordance with the present invention, gypsum slurries are prepared by mixing gypsum and water. The gypsum slurries are further blended with epoxy resins and hardeners. The gypsum foams in the present invention are prepared by adding the preformed foams into the resulting gypsum slurries under agitation until the wet density of the foam slurries reach 5 to 100 pounds per cubic foot (pcf). A preferred embodiment may optionally contain 0.1–15 parts epoxy resins, and 0–15 parts hardening agent, per 100 parts gypsum.

The foaming agents with excellent foam stability and water resistance in the present invention are prepared by a preformed foam composition formed of a long-chain organic cation-forming compound having the general formula (I):

(I)

where R is an aliphatic hydrocarbon radical having from 8 to 24 carbon atoms; $R_1$ is selected form the group consisting of an alkyl group having from 1–16 carbon atoms, a hydroxyalkyl group having from 1–16 carbon atoms, a benzyl group, a group which, when taken together with the nitrogen, represents a heterocyclic radical, and any of such groups having a hydrogen atom replaced by a fluorine atom; $R_2$ and $R_3$ are selected form the group consisting of an alkyl group having form 1–6 carbon atoms, a hydroxyalkyl group having from 1–6 carbon atoms, a benzyl group, a hydrogen atom, a group which, when taken together with the nitrogen, represents a heterocyclic radical, and any of such groups having a hydrogen atom replaced by a fluorine atom; and $X^-$ is an anionic counter ion; and a long-chain anionic forming compound having the formula (II):

(II)

where R' is an aliphatic hydrocarbon radical with 10 to 24 carbon atoms; $X_2^-$ is an anionic group selected from the group consisting of carboxylate, sulfate, sulfonate, and phosphate; and $Y^+$ is a cationic counter ion selected from the group consisting of ammonium, sodium, and potassium salt; wherein the long-chain organic cation formed from (I) and the long-chain organic anion formed from (II) are present in a weight ratio of from 0.05:1 to 15:1. The gypsum foam slurries made with the above preferred foaming agents give excellent foam stability. The detailed preparation of the foams is found in U.S. Pat. No. 5,696,174.

The epoxy resins in this invention are commonly formed by reacting epichlorohydrin with desired polyepoxides, such as glycidyl ether of 2,2'-bis(4-hydroxyphenyl)propane, n-butyl gylcidyl ether of 2,2'-bis(4-hydroxyphenyl)propane, glycidyl ethers of 1,1,2,2-tetrakis(4-hydroxyphenyl)ethane, polyglycidyl ether of 1,1,5,5-tetrakis(hydroxyphenyl) pentane, and (chloromethyl)oxirane 4,4'-(1-methylethylidene)bisphenol. Other epoxy resins suitable for use in the present invention include bisphenol F epoxy resins, such as bisphenol F epoxy resin and epoxy phenol Novolac; di(2,3-epoxybutyl)phthalate; di(2,3-epoxybutyl) adipate; di(2,3-epoxy octyl)terephthalate; 2,3-epoxybutyl 3,4-epoxypentanoate; 3,4-epoxypropyl 3,4-epoxyhexanoate; a synthetic polymer latex having ureido functional groups described in U.S. Pat. No. 5,162,060 and references therein; or a mixture of two or more epoxy resins.

The hardening agents in this invention comprise anhydrides, such as phthalic anhydride; alkylamine, such as a fatty amine; polyether diamine such as Jeffamine ED 900 (Jefferson Chemical Co., Inc., Houston, Tex.), polyakylene polyamines, such as, such as diethylene triamine, triethylene tetramine, tetraethylene pentamine, N,N'-bis-(2-aminopropyl)-ethylene diamine, and m-phenylenediamine; cylcoaliphatic diamines, such as 3-aminomethyl-3,5,5-trimethyl clclohexylamine, and m-xylene diamine.

The additional additives of this invention include inert fillers, aggregates, clay, sand, fibers, pigments, dyes, polymeric cement binder, plasticizers, superplasticizers, mineral wool, scrim, freeze-preventative additives, and combinations of these additives.

The addition of epoxy resins and hardeners do not adversely affect the foam stability of lightweight foam gypsum compositions in the present invention. The improved lightweight foam gypsum boards with the addition of epoxy resins and hardeners give high compressive strength, high bending strength, good surface abrasive resistance, washability, and excellent sagging resistance. This makes the improved lightweight foam gypsum boards useful as boards, interior wall panels, ceiling tiles, acoustical tiles, acoustical panels, roof decking, and flooring.

EXAMPLE 1

A first composition was produced by mixing 150 grams of water and 9 grams of foam agent AFT420A (Allied Foam Tech, North Wales, Pa.) in a five quart stainless steel bowl. The combination was whipped on a ten speed Hobart blender (Kitchen Aid) for about 3 minutes until a low density foam having a density of 0.03–0.08 g/cc was obtained. A second mixture of 8.25 grams of foam stabilizer AFT425B and 8.25 grams of water was poured into the first preformed foam mixture under mixing. The mixing was continued until a homogeneous foam mix was obtained (about one to two minutes). The density of the final foam was about 0.05–0.08 g/cc.

EXAMPLE 2

A composition was produced by mixing 65 grams of Evercoat 643 Part I (Fibre Glass from Evercoat, Ohio) with 62.8 g of water in a 200 ml flask. 4.2 grams of Triton X-405 (Union Carbide) was added and the mixture was stirred during the addition of Triton X-405. The stirring was continued for a further 5 minutes.

EXAMPLE 3

This composition was produced by mixing 65 grams of Evercoat 643 Part II (Fibre Glass-Evercoat, Ohio) with 62.8 g of water in a 200 ml flask. 2.2 grams of Triton X-405 was then added while stirring. The stirring was continued for a further 5 minutes.

EXAMPLE 4

A hydraulic gypsum slurry was prepared by mixing 480 grams of Plaster of Paris with 300 grams of water. The preformed foam composition made in EXAMPLE 1 was slowly added to the slurry under mixing until the wet density of the foamed slurry reached 23 pounds per cubic foot (pcf) (which took about 115 grams of the prefoam of EXAMPLE 1). The resulting mixture was immediately poured into a mold to make a 3¼"×7½"×1" rectangular gypsum foam block for a flexural test (ASTM D 790M-81 four-point loading system) and a 2" cubic block for a compressive test (ASTM C 109). The samples were cured at 53° C. for 2 days before both the flexural and compressive tests were performed. The flexural strength and compressive strength of the lightweight gypsum foam are 16 pounds per square inch (psi) and 18 psi, respectively. These results are summarized in TABLE I.

EXAMPLE 5

A hydraulic gypsum slurry was prepared by mixing 480 grams of Plaster of Paris with 294 grams of water, 12 grams of the composition defined by EXAMPLE 2, and 12 grams of the composition defined in EXAMPLE 3. The preformed foam composition of EXAMPLE 1 was slowly added into the slurry under mixing until the wet density of the foamed slurry reached 23 pcf (which took about 121 grams of the prefoam of EXAMPLE 1). The resulting mixture was immediately poured into a mold to make a 3¼"×7½"×1" rectangular gypsum foam block for flexural testing and a 2" cubic block for compressive testing. The samples were cured at 53° C. for 2 days before both the flexural test and compressive test were performed. Both the flexural strength and compressive strength of the lightweight gypsum foam composition increased after the epoxy and hardener were added to the gypsum slurry. The flexural strength and compressive strength of the lightweight gypsum foam are 30 pounds per square inch (psi) and 32 psi, respectively (EXAMPLE 5 in Table I) while that of EXAMPLE 4 are only 16 psi and 18 psi respectively.

EXAMPLE 6

A hydraulic gypsum slurry was prepared by mixing 480 grams of Plaster of Paris with 294 grams of water, 12 grams of the composition as defined in EXAMPLE 2, and 7.6 grams of water soluble aliphatic polyamine. The preformed foam made in accordance with EXAMPLE 1 was slowly added into the slurry under mixing until its wet density reached 23 pcf. This took about 115 grams of the composition of EXAMPLE 1. The resulting mixture was immediately poured into the mold to make a 3¼"×7½"×1" rectangular gypsum foam block for flexural testing and a 2" cubic block for compressive testing. The samples were cured at 53° C. for 2 days before both the flexural stress test and compressive testing was performed. Both the flexural stress and compressive stress of the lightweight gypsum foam was greater than 25 psi. The flexural strength and compressive strength of the lightweight gypsum foam were 36 psi and 42 psi, respectively. The results are presented in TABLE I.

EXAMPLE 7

A hydraulic gypsum slurry was prepared by mixing 480 grams of Plaster of Paris with 288.8 grams of water, 12 grams of (chloromethyl)oxirane 4,4'-(1-methylethylidene) bisphenol, and 7.6 grams of water soluble aliphatic polyamine. The preformed foam in EXAMPLE 1 was slowly added into the slurry under mixing until the wet density of the foamed slurry reached 23 pcf (which took about 122 grams of the prefoam composition of EXAMPLE 1). The resulting mixture was immediately poured into the mold to make 3¼"×7½"×1" rectangular gypsum foam blocks for flexural test and 2" cubic block for compressive test. The samples were cured at 53° C. for 2 days before both flexural test and compressive test were performed. The flexural strength and compressive strength of the lightweight gypsum foam were 24 psi and 37 psi, respectively.

EXAMPLE 8

A hydraulic gypsum slurry was prepared by mixing 480 grams of Plaster of Paris with 277.8 grams of water, 36 grams of (chloromethyl)oxirane 4,4'-(1-methylethylidene) bisphenol, and 22.6 grams of water soluble aliphatic polyamine. The preformed foam in EXAMPLE 1 was slowly added into the slurry under mixing until the wet density of the foamed slurry reached 23 pcf (which took about 134 grams of the prefoam composition of EXAMPLE 1). The resulting mixture was immediately poured into the mold to make 3¼"×7½"×1" rectangular gypsum foam blocks for flexural test ASTM and 2" cubic block for compressive test ASTM. The samples were cured at 53° C. for 2 days before both flexural test and compressive test were performed. The flexural strength and compressive strength of the lightweight gypsum foam were 39 psi and 43 psi, respectively. The results are presented in TABLE I.

EXAMPLE 9

A hydraulic gypsum slurry was prepared by mixing 480 grams of Plaster of Paris with 255 grams of water, 48 grams of (chloromethyl)oxirane 4,4'-(1-methylethylidene) bisphenol, and 31 grams of water soluble aliphatic polyamine. The preformed foam in EXAMPLE 1 was slowly added into the slurry under mixing until the wet density of the foamed slurry reached 23 pcf (which took about 130 grams of the prefoam composition of EXAMPLE 1). The resulting mixture was immediately poured into the mold to make 3¼"×7½"×1" rectangular gypsum foam blocks for flexural test and 2" cubic block for compressive test. The samples were cured at 53° C. for 2 days before both flexural and compressive tests were performed. The flexural strength and compressive strength of the lightweight gypsum foam were 47 psi and 48 psi, respectively. These results are presented in TABLE I.

EXAMPLE 10

A hydraulic gypsum slurry was prepared by mixing 480 grams of Plaster of Paris with 244.4 grams of water, 60 grams of (chloromethyl)oxirane 4,4'-(1-methylethylidene) bisphenol, and 37.6 grams of water soluble aliphatic polyamine. The preformed foam in EXAMPLE 1 was slowly added into the slurry under mixing until the wet density of the foamed slurry reached 23 pcf (which took about 142 grams of the prefoam composition of EXAMPLE 1). The resulting mixture was immediately poured into the mold to make 3¼"×7½"×1" rectangular gypsum foam blocks for flexural test and 2" cubic block for compressive test. The samples were cured at 53° C. for 2 days before both flexural test and compressive test were performed. The flexural strength and compressive strength of the lightweight gypsum foam are 27 psi and 38 psi, respectively. These results are presented in TABLE I.

TABLE I

| | Example: | | | | | | |
| --- | --- | --- | --- | --- | --- | --- | --- |
| | 4 (comparative) | 5 | 6 | 7 | 8 | 9 | 10 |
| Plaster of Paris (grams) | 480 | 480 | 480 | 480 | 480 | 480 | 480 |
| Water (grams) | 300 | 294 | 294 | 289 | 266 | 255 | 294 |
| Example 1 (prefoam)(grams) | 115 | 121 | 115 | 122 | 134 | 130 | 142 |
| Example 2 (Evercoat 643 Part I) (grams) | | 12 | 12 | | | | |

TABLE I-continued

|  | Example: | | | | | | |
|---|---|---|---|---|---|---|---|
|  | 4 (comparative) | 5 | 6 | 7 | 8 | 9 | 10 |
| Example 3 (Evercoat 643 Part II) (grams) |  | 12 |  |  |  |  |  |
| (chloromethyl)oxirane 4,4'-(1-methylethylidene)bisphenol (grams) |  |  |  | 12 | 36 | 48 | 60 |
| water soluble aliphatic polyamine (grams) |  |  | 7.6 | 7.6 | 22.6 | 31 | 37.6 |
| Flexural Strength (psi) | 16 | 30 | 36 | 24 | 39 | 47 | 27 |
| Compressive Strength (psi) | 18 | 32 | 42 | 37 | 43 | 48 | 38 |

EXAMPLE 11

150 grams of water and 7.5 grams of hydrolyzed protein (Mearl Corp., Roselle Park, N.J.) were added into a five quart stainless steel bowl. The contents were whipped on a ten speed Hobart blender (Kitchen Aid) until a low density foam having a density of 0.05–0.08 g/cc was obtained. This took one to three minutes.

EXAMPLE 12

A hydraulic gypsum slurry was prepared by mixing 480 grams of Plaster of Paris (gypsum) with 300 grams of water. The preformed foam in EXAMPLE 11 was slowly added into the slurry under mixing until the wet density of the foamed slurry reached 23 pcf. The resulting mixture was immediately poured into the mold to make 3¼"×7½"×1" rectangular gypsum foam blocks for flexural tests. The resulting gypsum samples showed foam collapse during the drying steps.

EXAMPLE 13

200 grams of water and 6 grams of sodium alkyl sulfonate surfactant were added into a five quart stainless steel bowl. The contents were whipped on a ten speed Hobart blender (Kitchen Aid) until a low density foam having a density of 0.03–0.06 g/cc was obtained. This took one to three minutes.

EXAMPLE 14

A hydraulic gypsum slurry was prepared by mixing 480 grams of Plaster of Paris (gypsum) with 300 grams of water. The preformed foam in EXAMPLE 13 was slowly added into the slurry under mixing until the wet density of the foamed slurry reached 23 pcf. The resulting mixture was immediately poured into the mold to make 3¼"×7½"×1" rectangular Gypsum foam blocks for flexural tests. The resulting gypsum samples showed foam collapse during the drying steps.

EXAMPLE 15

A hydraulic gypsum slurry was prepared by mixing 120 grams of Plaster of Paris, 1 gram of condensed naphthalene sulfonate, 0.6 grams of fiber with 75 grams of water. The preformed foam of EXAMPLE 1 was slowly added into the slurry under mixing until the wet density of the foamed slurry reached 15 pcf. The resulting mixture was immediately poured into the mold to make 3¼"×7½"×1" rectangular gypsum foam blocks for flexural tests. The samples were cured at 53° C. for 2 days before flexural tests were performed. The resultant flexural strength was determined to be 26 psi. The result is presented in TABLE II.

EXAMPLE 16

A hydraulic gypsum slurry was prepared by mixing 120 grams of Plaster of Paris, 1 gram of condensed naphthalene sulfonate, and 0.6 grams of fiber with 72.2 grams of water. 3 grams of (chloromethyl)oxirane 4,4'-(1-methylethylidene) bisphenol and 1.9 grams water soluble aliphatic polyamine were added into the slurry under mixing. The preformed foam of EXAMPLE 1 was slowly added into the resulting slurry under mixing until the wet density of the foamed slurry reached 15 pcf The resulting mixture was immediately poured into the mold to make 3¼"×7½"×1" rectangular gypsum foam blocks for flexural tests. The samples were cured at 53° C. for 2 days before flexural tests were performed. The resultant flexural strength was determined to be 52 psi. The result is presented in TABLE II.

EXAMPLE 17

A hydraulic gypsum slurry was prepared by mixing 120 grams of Plaster of Paris, 1 gram of condensed naphthalene sulfonate, and 0.6 grams of fiber with 69.5 grams of water. Six (6) grams of (chloromethyl)oxirane 4,4'-(1-methylethylidene)bisphenol and 3.75 grams of water soluble aliphatic polyamine were added into the slurry under mixing. The preformed foam of EXAMPLE 1 was slowly added into the resulting slurry under mixing until the wet density of the foamed slurry reached 15 pcf The resulting mixture was immediately poured into the mold to make 3¼"×7½"×1" rectangular gypsum foam blocks for flexural tests. The samples were cured at 53° C. for 2 days before flexural tests were performed. The resultant flexural strength was determined to be 87 psi. The result is presented in TABLE II.

EXAMPLE 18

A hydraulic gypsum slurry was prepared by mixing 120 grams of Plaster of Paris, 1 gram of condensed naphthalene sulfonate, and 0.6 grams of fiber with 66.6 grams of water. Nine (9) grams of (chloromethyl)oxirane 4,4'-(1-methylethylidene)bisphenol and 5.65 grams of water soluble aliphatic polyamine were added into the slurry under mixing. The preformed foam in EXAMPLE 1 was slowly added into the resulting slurry under mixing until the wet density of the foamed slurry reached 15 pcf. The resulting mixture was immediately poured into the mold to make 3¼"×7½"×1" rectangular gypsum foam blocks for flexural tests. The samples were cured at 53° C. for 2 days before flexural tests were performed. The resultant flexural strength was determined to be 91 psi. The result is presented in TABLE II.

EXAMPLE 19

A hydraulic gypsum slurry was prepared by mixing 120 grams of Plaster of Paris, 1 gram of condensed naphthalene sulfonate, and 0.6 grams of fiber with 63.8 grams of water. Twelve (12) grams of (chloromethyl)oxirane 4,4'-(1-methylethylidene)bisphenol and 7.75 grams of water soluble aliphatic polyamine were added into the slurry under mixing. The preformed foam in EXAMPLE 1 was slowly added into the resulting slurry under mixing until the wet density of the foamed slurry reached 15 pcf The resulting mixture was immediately poured into the mold to make 3¼"×7½"×1" rectangular gypsum foam blocks for flexural tests. The samples were cured at 53° C. for 2 days before flexural tests were performed. The resultant flexural strength was determined to be 107 psi. The result is presented in TABLE II.

EXAMPLE 20

A hydraulic gypsum slurry was prepared by mixing 120 grams of Plaster of Paris, 1 gram of condensed naphthalene sulfonate, and 0.6 grams of fiber with 61.1 grams of water. Fifteen (15) grams of (chloromethyl)oxirane 4,4'-(1-methylethylidene)bisphenol and 9.4 grams of water soluble aliphatic polyamine were added into the slurry under mixing. The preformed foam in EXAMPLE 1 was slowly added into the resulting slurry under mixing until the wet density of the foamed slurry reached 15 pcf. The resulting mixture was immediately poured into the mold to make 3¼"×7½"×1" rectangular gypsum foam blocks for flexural tests. The samples were cured at 53° C. for 2 days before flexural tests were performed. The resultant flexural strength was determined to be 73 psi. The result is presented in TABLE II.

TABLE II

| | Example: | | | | | |
|---|---|---|---|---|---|---|
| | 15 (comparative) | 16 | 17 | 18 | 19 | 20 |
| Plaster of Paris | 120 | 120 | 120 | 120 | 120 | 120 |
| Water | 75 | 72.2 | 69.5 | 66.6 | 63.8 | 61.1 |
| Condensed naphthalene sulfonate | 1 | 1 | 1 | 1 | 1 | 1 |
| Fiber | 0.6 | 0.6 | 0.6 | 0.6 | 0.6 | 0.6 |
| (chloromethyl)oxirane 4,4'-(1-methylethylidene)bisphenol | 0 | 3 | 6 | 9 | 12 | 15 |
| water soluble aliphatic polyamine | 0 | 1.9 | 3.75 | 5.65 | 7.75 | 9.4 |
| Flexural Strength (psi) | 26 | 52 | 87 | 91 | 107 | 73 |

Although illustrated and described herein with reference to certain specific examples, the present invention is nevertheless not intended to be limited to the details shown. Rather, various modifications may be made in the details within the scope and range of equivalents of the claims and without departing from the spirit of the invention.

What is claimed:

1. A composition for use in making a crosslinked, foamed gypsum product, said composition comprising:
   gypsum;
   a foaming agent which is the reaction product of a long-chain organic cation-forming compound having the general formula (I):

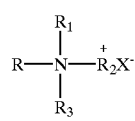

where R is an aliphatic hydrocarbon radical having from 8 to 24 carbon atoms; $R_1$ is selected form the group consisting of an alkyl group having from 1–16 carbon atoms, a hydroxyalkyl group having from 1–16 carbon atoms, a benzyl group, a group which, when taken together with the nitrogen, represents a heterocyclic radical, and any of such groups having a hydrogen atom replaced by a fluorine atom; $R_2$ and $R_3$ are selected form the group consisting of an alkyl group having form 1–6 carbon atoms, a hydroxyalkyl group having from 1–6 carbon atoms, a benzyl group, a hydrogen atom, a group which, when taken together with the nitrogen, represents a heterocyclic radical, and any of such groups having a hydrogen atom replaced by a fluorine atom; and $X^-$ is an anionic counter ion; and a long-chain anionic forming compound having the formula (II):

where R' is an aliphatic hydrocarbon radical with 10 to 24 carbon atoms; $X_2^-$ is an anionic group selected from the group consisting of carboxylate, sulfate, sulfonate, and phosphate; and Y+ is a cationic counter ion selected from the group consisting of ammonium, sodium, and potassium salt; wherein the long-chain organic cation formed from (I) and the long-chain organic anion formed from (II) are present in a weight ratio of from 0.05:1 to 15:1;
   epoxy resin; and
   a hardener.

2. The composition of claim 1 wherein said epoxy resin is selected from the group consisting of:
   (A) the reaction products of:
      epichlorohydrin and a polyepoxide selected from group consisting of: glycidyl ether of 2,2'-bis(4-hydroxyphenyl)propane, n-butyl gylcidyl ether of 2,2'-bis(4-hydroxyphenyl)propane, glycidyl ethers of 1,1,2,2-tetrakis(4-hydroxyphenyl)ethane, polygylcidyl ether of 1,1,5,5-tetrakis (hydroxyphenyl)pentane;
   (B) (chloromethyl) oxirane 4,4'-(1-ethylethylidene) bisphenol;
   (C) bisphenol F epoxy resin;
   (D) di(2,3-epoxy butyl)phthalate;
   (E) di(2,3-epoxy butyl)adipate;
   (F) di(2,3-epoxy octyl)terephthalate;
   (G) 2,3-epoxybutyl 3,4-epoxypentanoate;
   (H) 3,4-epoxypropyl 3,4-epoxyhexanoate; and
   (I) a synthetic polymer latex having ureido functional groups.

3. The composition of claim 2 wherein said bisphenol F Epoxy resin is epoxy phenol novolac.

4. The composition of claim 1 wherein said hardener is selected from the group consisting of phthalic anhydride, alkylamine, polyether diamine, polyalkylene polyamines, N,N'-bis-(2-aminopropyl)-ethylene diamine, m-phenylenediamine, and cycloaliphatic diamines.

5. The composition of claim 2 wherein said cycloaliphatic diamine is one of 3-aminomethyl-3,5,5-trimethyl cyclohexylamine, and m-xylene diamine.

6. The composition of claim 2 wherein said polyalkylene polyamine is selected from the group consisting of diethylene triamine, triethylene tetramine, and tetraethylene pentamine.

7. The composition of claim 1 wherein the density of the foamed gypsum is from 5 pounds per cubic foot to 100 pounds per cubic foot.

8. The composition of claim 1 further comprising one or more additives selected from the group consisting of inert filler, aggregate, clay, sand, fiber, pigment, dye, polymeric cement binder, plasticizer, superplasticizer, mineral wool, scrim, freeze-preventative additives, and combinations thereof.

9. An object comprised of the composition of claim 1, said object selected from the group consisting of a boards, interior wall panels, ceiling tiles, acoustical tiles, acoustical panels, roof decking, and flooring.

* * * * *